(12) United States Patent
Lamb et al.

(10) Patent No.: US 7,223,005 B2
(45) Date of Patent: May 29, 2007

(54) HYBRID LIGHTGUIDE BACKLIGHT

(76) Inventors: David J. Lamb, P.O. Box 33427, St. Paul, MN (US) 55133-3427; Keith M. Kotchick, P.O. Box 33427, St. Paul, MN (US) 55133-3427; Mark E. Gardiner, P.O. Box 33427, St. Paul, MN (US) 55133-3427; Mark B. O'Neill, P.O. Box 33427, St. Paul, MN (US) 55133-3427; Patrick H. Marushin, P.O. Box 33427, St. Paul, MN (US) 55133-3427; Kenneth A. Epstein, P.O. Box 33427, St. Paul, MN (US) 55133-3427; Philip E. Watson, P.O. Box 33427, St. Paul, MN (US) 55133-3427

( * ) Notice: Subject to any disclaimer, the term of this patent is extended or adjusted under 35 U.S.C. 154(b) by 183 days.

(21) Appl. No.: 10/744,661

(22) Filed: Dec. 23, 2003

(65) Prior Publication Data

US 2005/0135117 A1    Jun. 23, 2005

(51) Int. Cl.
    *F21V 7/00* (2006.01)
(52) U.S. Cl. .............. 362/615; 362/600; 362/606; 362/607; 362/608; 362/609; 362/616; 362/617; 362/618; 362/619; 362/620; 362/621; 362/622; 362/623; 362/624; 362/625; 362/626; 349/62; 349/96
(58) Field of Classification Search ........ 362/606–609, 362/615–626, 600; 349/62, 96
See application file for complete search history.

(56) References Cited

U.S. PATENT DOCUMENTS

| 5,359,691 A | 10/1994 | Tai |
| 5,387,921 A | 2/1995 | Zhang |
| 5,587,816 A * | 12/1996 | Gunjima et al. .............. 349/62 |
| 5,899,552 A | 5/1999 | Yokoyama |
| 5,921,670 A | 7/1999 | Schumacher |
| 5,956,107 A | 9/1999 | Hashimoto |
| 6,014,192 A | 1/2000 | Lehureau |
| 6,024,462 A | 2/2000 | Whitehead |
| 6,025,897 A | 2/2000 | Weber |

(Continued)

FOREIGN PATENT DOCUMENTS

WO    WO 00/34710    6/2000

(Continued)

OTHER PUBLICATIONS

U.S. Appl. No. 10/744,569, filed Dec. 23, 2003, Lamb.

*Primary Examiner*—Renee Luebke
*Assistant Examiner*—Mary Zettl
(74) *Attorney, Agent, or Firm*—Scott A. Bardell (57) ABSTRACT

Backlighting systems are disclosed, which include a lightguide with at least one light source optically connected to an edge of the lightguide for supplying light into its interior and a reflective cavity with at least one light source optically connected to the reflective cavity for supplying light into its interior. The reflective cavity may include a first reflector and a second reflector and at least one source may be disposed at an edge of the reflective cavity. Alternatively, the reflective cavity may include a back reflector portion and light sources may be disposed at the back reflector portion.

23 Claims, 4 Drawing Sheets

U.S. PATENT DOCUMENTS

| | | |
|---|---|---|
| 6,079,844 A | 6/2000 | Whitehead |
| 6,147,725 A | 11/2000 | Yuuki |
| 6,243,068 B1 | 6/2001 | Evanicky |
| 6,290,364 B1 | 9/2001 | Koike |
| 6,443,585 B1 | 9/2002 | Saccomanno |
| 6,448,955 B1 | 9/2002 | Evanicky |
| 6,612,723 B2 | 9/2003 | Futhey |
| 6,692,137 B2 | 2/2004 | Blanchard |
| 6,778,235 B2 | 8/2004 | Takahashi |
| 2001/0017774 A1 | 8/2001 | Ito |
| 2002/0067444 A1 | 6/2002 | Paolini |
| 2002/0141194 A1 | 10/2002 | Wortman |
| 2002/0172031 A1 | 11/2002 | Masuda |
| 2003/0048639 A1 | 3/2003 | Boyd |
| 2003/0063436 A1 | 4/2003 | Hara |
| 2003/0063456 A1 | 4/2003 | Katahira |
| 2003/0118805 A1 | 6/2003 | Kretman |
| 2003/0184990 A1 | 10/2003 | Lin |
| 2004/0223343 A1 | 11/2004 | Chu |
| 2005/0057913 A1 | 3/2005 | Dennis |

FOREIGN PATENT DOCUMENTS

| | | |
|---|---|---|
| WO | WO 01/71248 | 9/2001 |
| WO | WO 01/81960 | 11/2001 |
| WO | WO 02/08663 | 1/2002 |
| WO | WO 03/029723 | 4/2003 |

* cited by examiner

HYBRID LIGHTGUIDE BACKLIGHT

FIELD OF THE INVENTION

The present disclosure relates to backlighting systems, which may be advantageously used with large high-performance liquid crystal displays. More specifically, the disclosure relates to backlighting systems that include lightguides of different configurations, e.g., edge-lit and direct-lit lightguides. Optionally, the backlighting systems of the present disclosure include various recycling enhancement structures.

BACKGROUND OF THE INVENTION

Liquid crystal displays (LCDs) are widely used in electronic display devices, such as computer monitors, handheld devices and televisions. Unlike cathode ray tube (CRT) displays, LCDs do not emit light and, thus, require a separate light source for viewing images formed on such displays. Ambient light illumination is sufficient for some applications, but with most large area and high performance LCDs, ambient light causes glare and is detrimental to readability. Thus, in order to improve readability, most large area and high performance LCDs include a source of light located behind the display, which is usually referred to as a "backlight."

Presently, many popular systems for backlighting LCDs include direct-lit backlights, in which multiple lamps or a single serpentine-shaped lamp are arranged behind the display in the field of view of the user, or edge-lit backlights, in which the lamps are placed along one or more edges of a lightguide located behind the display, so that the lamps are out of the field of view of the user. In order to compete with CRT displays, large LCD displays (e.g., greater than ~20" or 50 cm in diagonal) must have high luminance targets, e.g., about 500 nt or more. Such high luminance targets are currently met by single-cavity direct-lit backlights for LCDs.

The use of conventional direct-lit backlighting systems, however, has caused some concerns among manufacturers of large LCDs, such as LCD televisions. One concern is a discrepancy between the intended lifetimes of LCD televisions, which for most consumers may be 10 to 20 years, and the lifetimes of individual lamps in the televisions' backlights, which are approximately 10,000 to 20,000 hours and usually at the lower end of this range. In particular, cold cathode fluorescent lamps (CCFLs), which are frequently used for backlighting, have varying lifetimes and aging characteristics. If one CCFL burns out in a conventional direct-lit backlight, the result will be a dark line directly across the display. In addition, the spatial color uniformity of a direct-lit display suffers as each CCFL ages differently. Major LCD manufacturers and television set makers currently do not have a model for servicing LCD television backlights that fail in either of these two modes.

Furthermore, light reaching the viewer from multiple sources in a conventional direct-lit backlight usually is not mixed as well as the light in edge-lit backlights. Nonetheless, despite this and other shortcomings, as well as the uniformity and aging disadvantages of conventional direct-lit backlights, they are currently a popular choice for backlighting LCD televisions, because they allow reaching luminance targets that are competitive with CRT televisions. On the other hand, although edge-lit-backlights would appear to be more advantageous in many respects, achieving desired levels of luminance with conventional edge-lit backlights has remained a challenge. One difficulty has been arranging a large enough number of light sources at an edge of a single lightguide to provide sufficient optical power to reach the target luminance. Other difficulties include enhancement film warping in conventional backlights, e.g., due to high thermal gradients and handling problems.

Thus, there remains a need in the field of backlights for large high-performance LCDs for backlighting systems that are capable of achieving high luminance targets and are more efficient. In addition, there remains a need for backlighting systems for large high-performance LCDs that overcome other shortcomings of the currently available backlighting systems described above.

SUMMARY

These and other shortcomings of the presently known backlighting systems for large high-performance LCDs are addressed by the inventors of the present disclosure by providing hybrid backlighting systems as disclosed and claimed herein. Such systems may be advantageously used with a variety of devices, including LCD televisions, LCD monitors, point of sale devices, and other suitable devices. The present disclosure mitigates the risks of using variable lifetime light sources, so that burnout or aging of an individual light source would not be catastrophic to the display viewing quality. Thus, if an individual light source ages or burns out in a hybrid system according to an embodiment of the present disclosure, the effect on spatial brightness and color uniformity will be relatively insignificant due to the enhanced light mixing.

The present disclosure eliminates the need for a thick diffuser plate traditionally used in single-cavity direct-lit backlights to hide individual sources from the viewer, thus providing additional gains in brightness. In addition, light extracted directly from the top lightguide is likely to exit at a wide range of angles, which would enhance off-axis viewability of the display. Moreover, the present disclosure makes possible the inclusion of additional features for preventing warp and physical damage to various enhancement structures that may be used in exemplary embodiments of the present disclosure.

Thus, the present disclosure is directed to backlighting systems, which in some exemplary embodiments include a lightguide, at least one light source optically connected to an edge of the lightguide for supplying light into its interior, a reflective cavity, and at least one light source optically connected to the reflective cavity for supplying light into its interior. The at least one light source optically connected to the reflective cavity may be disposed at an edge of the reflective cavity or in the interior of the reflective cavity. Alternatively, at least one light source may be disposed at an edge of the reflective cavity and at least one light source may be disposed in the interior of the reflective cavity.

In other exemplary embodiments, the backlighting systems include a lightguide, at least one light source optically connected to a first edge of the lightguide for supplying light into its interior, a reflective cavity, and at least one light source optically connected to a first edge of the reflective cavity for supplying light into its interior. The first edge of the first lightguide may or may not be substantially aligned with the first edge of the reflective cavity. The backlighting system according to such exemplary embodiments of the present disclosure may further include a collimating structure disposed over a light source that is optically connected to the reflective cavity or it may include a diffuse extractor for extracting light from the reflective cavity.

The reflective cavity may include a first reflector and a second semi-transparent reflector disposed between the lightguide and the first reflector. Optionally, the first reflector may be semi-transparent also. At least one light source may be optically connected to a second edge of the reflective cavity. The first collimating structure may be disposed over the at least one light source optically connected to the first edge of the reflective cavity and a second collimating structure may be disposed over the at least one light source optically connected to the second edge of the reflective cavity. The first and second collimating structures may include prismatic structures, having grooves generally parallel to the first and second reflectors and having prism apexes generally facing the interior of the reflective cavity, or two-dimensional Fresnel lenses. If Fresnel lenses are used as collimating structures, light sources are preferably disposed near the focal lines of the Fresnel lenses and may include a linear array of LEDs.

In the appropriate embodiments of the present disclosure, the second semi-transparent reflector includes prismatic structures having prism apexes generally facing away from the reflective cavity, and the first and second collimating structures are configured so that they transmit light substantially within a numerical aperture of the prismatic structures. The first and second collimating structures each may include a reflective polarizer having a pass axis generally orthogonal to that of a reflective polarizer that may be included into the second semi-transparent reflector.

The present disclosure also is directed to backlighting systems, which include a lightguide, at least one light source optically connected to a first edge of the lightguide for supplying light into its interior, a reflective cavity, and at least one light source disposed in the interior of the reflective cavity. The reflective cavity may include a back reflector portion, at least one light source disposed at the back reflector portion, and may further include a side reflector portion. In some embodiments, the backlighting system may further include a diffuser disposed between the reflective cavity and the lightguide, which may include a rigid optically clear plate and a diffuser sheet attached thereto. The light sources disposed in the reflective cavity may include an array of light sources, an extended light source, or an array of linear light sources substantially parallel to each other. In the latter case, the first edge of the lightguide may be substantially orthogonal or substantially parallel to the linear light sources. The lightguide may include surface structures disposed on the surface that faces the reflective cavity, such as a plurality of prismatic structures substantially symmetrical about a horizontal axis.

In the appropriate embodiments of the present disclosure, the backlighting systems include a first recycling enhancement structure disposed at a surface of the lightguide. The first enhancement structure may include a reflective polarizer, a reflective polarizer and a diffuser, or a reflective polarizer and a prismatic structure. In certain embodiments, the first recycling enhancement structure is attached to a surface of the lightguide. Alternatively or additionally, the backlighting systems further include a second recycling enhancement structure disposed between the lightguide and the reflective cavity. The second recycling enhancement structure may include one or more prismatic structures. In certain embodiments, the second recycling enhancement structure is attached to a surface of the lightguide.

These and other aspects of the backlighting systems of the subject invention will become more readily apparent to those having ordinary skill in the art from the following detailed description together with the drawings.

BRIEF DESCRIPTION OF THE DRAWINGS

So that those having ordinary skill in the art to which the subject invention pertains will more readily understand how to make and use the subject invention, exemplary embodiments thereof will be described in detail below with reference to the drawings, wherein.

DETAILED DESCRIPTION

Figure 1:
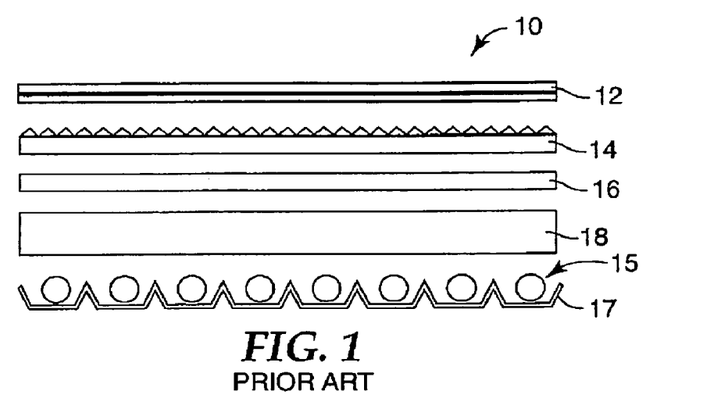
FIG. 1 is a schematic cross-sectional view of a conventional direct-lit backlight for LCD televisions.

FIG. 1 illustrates the structure and components of a traditional single-cavity direct-lit backlight 10, such as those presently used in LCD televisions. The traditional backlight 10 includes an array of light bulbs 15, typically CCFLs, and a shaped reflector 17 located behind the array of light bulbs 15 for directing more light toward a viewer. A thick diffuser plate 18 is usually placed over the array of light bulbs 15 to diffuse light from the individual bulbs, e.g., CCFLs, in order to hide them from the viewer. A typical diffuser plate 18 has a large amount of absorption associated with it, as well as a large amount of back scattering, the effects of which grow exponentially if light-recycling enhancement films (described below) are added to the backlight. To further aid in hiding individual light bulbs from the viewer, diffuser plates have been patterned, which resulted in additional losses of light.

The traditional backlight 10 further includes a thin diffuser sheet 16 and a layer of enhancement film 14 having prismatic surface structures, such as Vikuiti™ Brightness Enhancement Film (BEF), available from 3M Company. The enhancement film 14 refracts light within a certain angle toward the viewer. Light outside that angle is "recycled," i.e., reflected back into the backlight 10 where it travels within the system until reaching the proper angle for exiting the system. In addition, the traditional backlight 10 includes a layer of reflective polarizer 12 placed over the enhancement film 14. The reflective polarizer 12 is usually a multilayer reflective polarizer, such as Vikuiti™ Dual Brightness Enhancement Film (DBEF), also available from 3M Company. The reflective polarizer 12 transmits light with a predetermined polarization, while reflecting light with a different polarization into the backlight 10 where the polarization state is altered and the light is then fed back to the reflective polarizer 12. This process is also referred to as "recycling."

Figure 2:
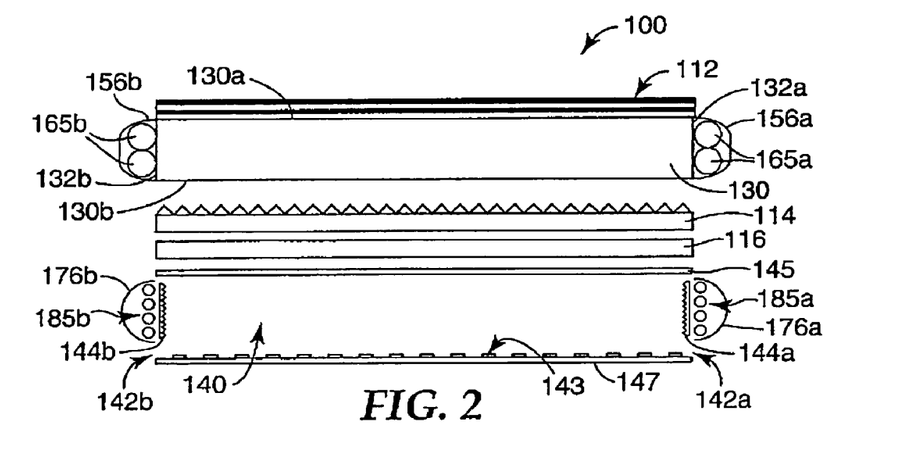
FIG. 2 is a schematic cross-sectional view of an exemplary embodiment of a backlighting system according to the present disclosure.

FIG. 2 shows a schematic cross-sectional view of a backlighting system 100 constructed according to an exemplary embodiment of the present disclosure. The backlighting system 100 includes a lightguide 130 and a reflective cavity 140. The lightguide 130 may be made of acrylic or another suitable material. In the exemplary embodiment shown in FIG. 2, light sources 165a and 165b are placed at the edges 132a and 132b of the lightguide 130, so that at least a portion of the light emanating from the sources 165a, 165b is coupled into the interior of the lightguide 130 and propagates along its length by reflecting from the surfaces 130a and 130b. Lamp cavity reflectors 156a and 156b may be provided as illustrated in FIG. 2, for increasing coupling efficiency from the sources 165a, 165b into the interior of the lightguide 130. As will be understood by those of ordinary skill in the art, shape and structure of the reflectors 156a, 156b may vary. For example, the reflectors 156a and 156b may be multilayer dielectric reflectors.

Referring further to FIG. 2, the reflective cavity 140 includes reflectors 145 and 147. In the exemplary embodiment illustrated in FIG. 2, at least the reflector 145 is a semi-transparent reflector, but in other exemplary embodiments of the present disclosure both reflectors 145 and 147 may be semi-transparent. Examples of structures suitable for use as semi-transparent reflectors include multilayer dielectric reflectors, including reflective polarizers, flame-textured multilayer dielectric reflectors (see, e.g., U.S. Pat. No. 6,096,247, the disclosure of which is incorporated by reference herein to the extent it is not inconsistent with the present disclosure), scattering-type wavelength-independent reflectors, multilayer dielectric reflectors with diffusing coatings, prismatic structured films, partially-silvered mirrors, perforated mirror films, any other suitable semi-transparent reflective structures known to those of ordinary skill in the art, and suitable combinations thereof. Depending on the specific application and the type of structure, in some exemplary embodiments such structures may be free-standing, in which case they may be fastened to a suitable support or frame, and in other exemplary embodiments they may be laminated onto a support, such as a rigid optically clear plate.

Examples of structures suitable for use as reflector 147 include semi-transparent reflectors, but may also include structures having relatively low transmission, such as a combination of two reflective polarizers with pass axes oriented at an angle $\Theta$ (in which case transmission will be approximately $0.5 \cos^2\Theta$ of the incident intensity), multilayer dielectric reflectors coated on both sides with a volume diffuser, or another type of diffuser, or having structured surfaces (see e.g., U.S. Pat. No. 6,208,466, the disclosure of which is incorporated by reference herein to the extent it is not inconsistent with the present disclosure), metal-coated mirrors, any other suitable reflective structures known to those of ordinary skill in the art, and suitable combinations thereof. Preferably, in exemplary embodiments of the present disclosure illustrated in FIG. 2, where a prismatic structured film such as BEF is used as the semi-transparent reflector 145, the film is disposed so that prism apexes point generally away from the reflective cavity 140. If the prismatic structured film includes longitudinal grooves, such grooves are preferably oriented generally perpendicular to the light input edges 142a and 142b of the reflective cavity 140.

Light sources 185a and 185b are placed at the edges 142a and 142b of the reflective cavity 140, so that at least a portion of the light emanating from the sources 185a, 185b is coupled into the interior of the reflective cavity 140 and propagates along its length by reflecting from the reflectors 145 and 147. Lamp cavity reflectors 176a and 176b may be provided, as illustrated in FIG. 2, for increasing coupling efficiency from the sources 185a, 185b into the reflective cavity 140. As will be understood by those of ordinary skill in the art, shape and structure of the reflectors 176a and 176b may vary. For example, the reflectors 176a and 176b may be multilayer dielectric reflectors.

Referring further to FIG. 2, collimating structures 144a and 144b may be placed over the light sources 185a and 185b for decreasing the angular spread of the light entering the interior of the reflective cavity 140 and thus improving spatial uniformity of the light extracted from the backlighting system 100. Exemplary collimating structures 144a and 144b may include prismatic structures configured and positioned so that they would at least partially collimate light emanating from the sources 185a and 185b by refracting into the interior of the reflective cavity 140 light within a certain angle of incidence and reflecting back toward the sources 185a or 185b light outside that angle. One example of such prismatic structured films suitable for use in the collimating structures 144a and 144b is BEF film arranged so that prism apexes point generally into the interior of the reflective cavity 140 and, if that specific type of prismatic structured film includes longitudinal grooves, the grooves are generally parallel to the planes of the reflectors 145 and 147. In such exemplary embodiments, if prismatic structured film such as BEF is used as the semi-transparent reflector 145, the collimating structures 144a and 144b are preferably configured so that the transmitted light is collimated to be within the numerical aperture of prismatic film for reflection.

Figure 2A:
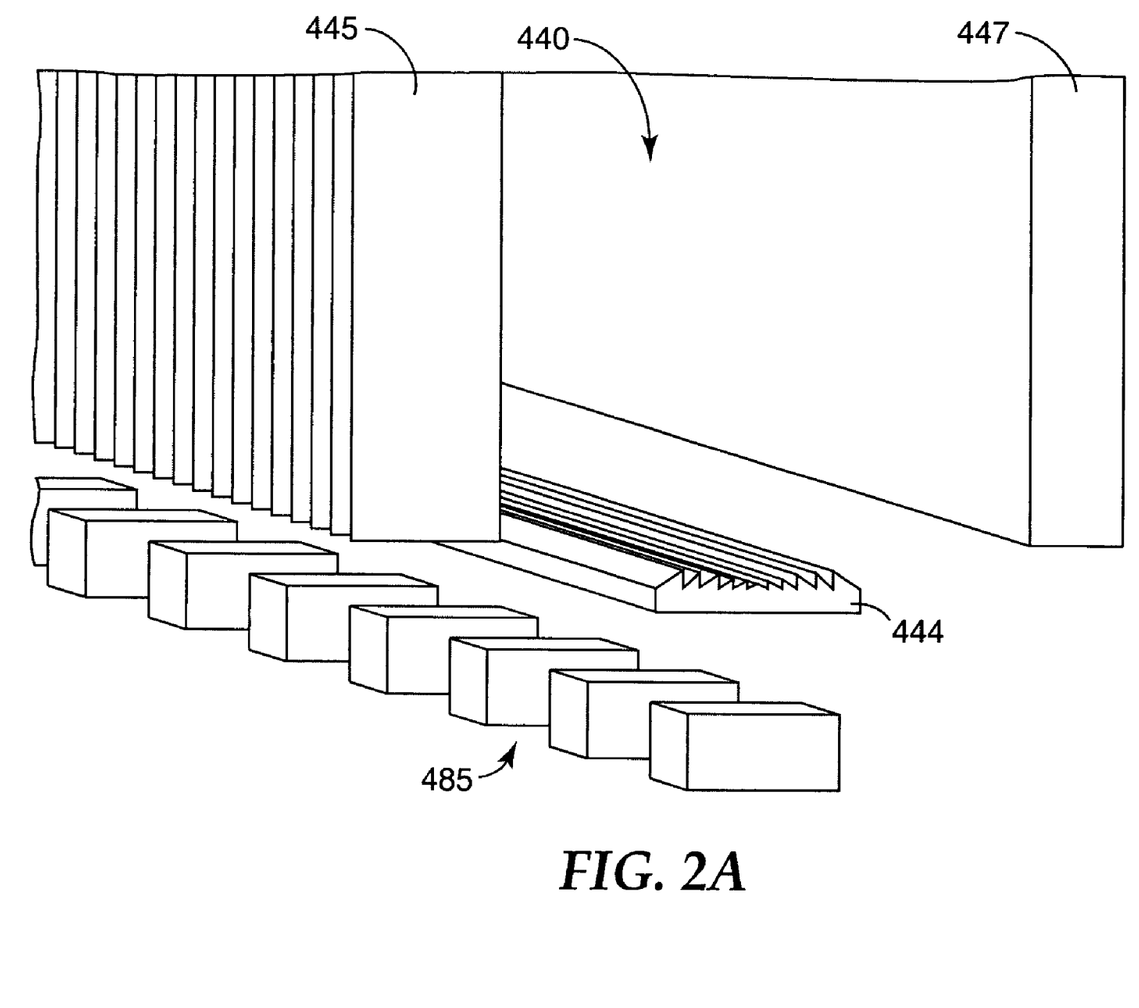
FIG. 2A is a schematic cross-sectional partial view of a reflective cavity of an embodiment of the present disclosure, illustrating another exemplary collimating structure.

Alternatively, collimating structures 144a and 144b may include two-dimensional Fresnel lenses, illustrated in FIG. 2A. FIG. 2A shows a schematic partial cross-sectional view of a hollow cavity 440, which includes a reflector 447 and a semi-transparent reflector 445. A linear array of sources 485 is disposed near the focal line of a collimating structure 444, which in this exemplary embodiment is a two-dimensional Fresnel lens. Other exemplary embodiments may utilize two-dimensional arrays of light sources in combination with lens arrays, so that each light source is disposed near the focal point of the corresponding lens in the lens array. Those of ordinary skill in the art will readily appreciate that a variety of other configurations of light sources and collimating structures are contemplated to be within the present disclosure.

Referring further to FIG. 2, optionally, the collimating structures 144a and 144b may include reflective polarizers, such as DBEF. This is particularly useful where a reflective polarizer is also included into the semi-transparent reflector 145, e.g., Vikuiti™ Diffuse Reflective Polarizing Film ("DRPF"), available from 3M Company. In such exemplary embodiments, the pass axis of the reflective polarizer in the semi-transparent reflector 145 preferably is generally orthogonal to the pass axes of the reflective polarizers in the collimating structures 144a and 144b.

Although the exemplary backlighting system 100 illustrated in FIG. 2 shows pairs of light sources 165a, 165b placed at the edges 132a, 132b of the lightguide 130 and eight sources 185a, 185b placed at the edges 142a, 142b of the reflective cavity 140, the present disclosure also contemplates using only one light source at an edge of the lightguide 130 and only one light source at an edge of the reflective cavity 140. In addition, although for ease of illustration light sources 165a and 165b are shown to be aligned with the light sources 185a and 185b, the present disclosure contemplates placing one or more light sources at any one or more edges of each lightguide. For example, FIGS. 3A and 3B, illustrate two alternative ways of arranging light sources 135a', 135a''', 145a', 145a'' and 135b', 135b''', 145b', 145b'' at the edges of generally rectangular lightguides and reflective cavities 130a, 130b, and 140a, 140b respectively.

Figure 3A:
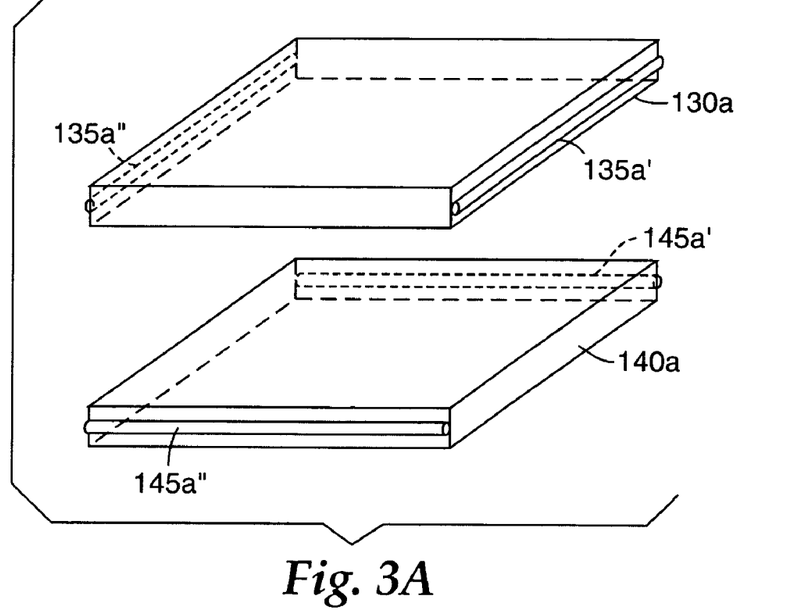
FIGS. 3A and 3B are schematic representations to illustrate alternative ways of arranging light sources at the edges of lightguides and reflective cavities.
Figure 3B:
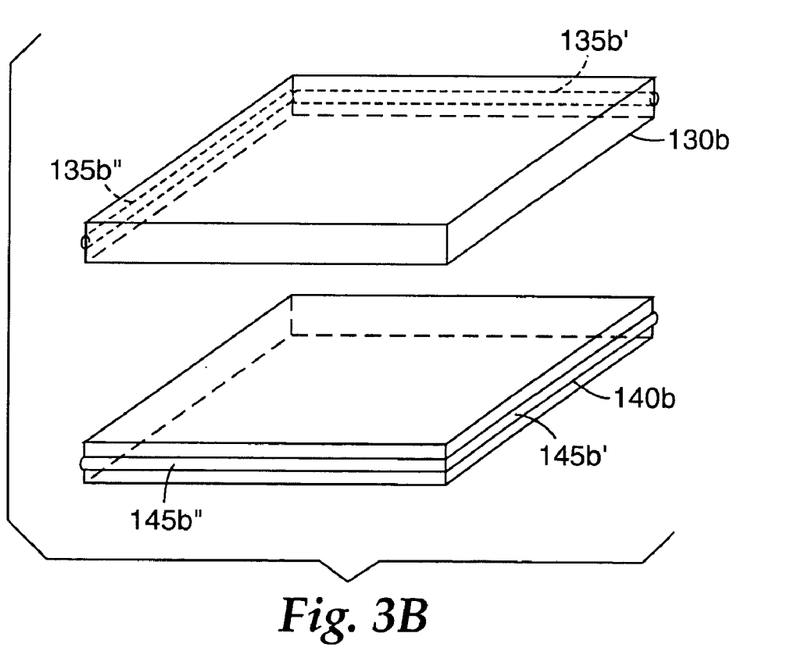

The schematic representations of FIGS. 3A and 3B, however, are not determinative of the shape and configuration of the light sources that may be used with embodiments of the present disclosure. Light sources suitable for use with embodiments of the present disclosure include any source that emits light, such as a fluorescent lamp (e.g., CCFL), a hot cathode fluorescent lamp (HCFL), an incandescent lamp, an electroluminescent light source, a phosphorescent light source, an external electrode fluorescent lamp, a light emitting diode (LED), including organic LEDs (OLEDs), an array of LEDs, any other suitable light source(s), or any appropriate number or combination thereof.

The number, configuration and type of lightguides may also vary. For example, three or more lightguides may be used in accordance with the present disclosure and any one or more of the constituent lightguides may be hollow, e.g., a reflective cavity. Increasing the number of lightguides in backlighting systems according to exemplary embodiments of the present disclosure would lead to corresponding increases in weights and thicknesses of displays. However, most manufacturers of large panel LCDs typically consider display thickness and weight to be secondary concerns. Lifetime, brightness, spatial uniformity, ease of assembly, and reduction in warp of enhancement films are usually considered to be more important.

Thus, the number and type of light sources arranged at an edge of a lightguide or a reflective cavity, e.g., 130 or 140, as well as the number, dimensions and type of the lightguides or reflective cavities will depend on the specific application and luminance target, as well as practical considerations including size of the specific source as compared to the dimensions of the lightguide. Notably, a large number of light sources may be arranged at one or more edges of a reflective cavity without substantial increase in weight of the backlighting system.

Referring further to FIG. 2, the backlighting system 100 may include a first recycling enhancement structure 112 disposed at a surface of the lightguide 130. In the context of the present disclosure, "a recycling enhancement structure" may be any structure that is capable of "recycling" light in a manner similar or equivalent to the enhancement films 12 and 14, described with reference to FIG. 1. The first recycling enhancement structure 112 may be disposed at the surface 130a and may include a reflective polarizer, such as a multilayer reflective polarizer Vikuiti™ Dual Brightness Enhancement Film (DBEF), available from 3M Company.

The first recycling enhancement structure may also include a diffuser, which may be integrated within the reflective polarizer or be included as a separate component, such as a matte surface or a layer of pressure sensitive adhesive (PSA). One function of the diffuser is the randomization of the polarization and direction of the light reflected back into the backlighting system 100. Vikuiti™ Diffuse Reflective Polarizer Film (DRPF) and Vikuiti™ Dual Brightness Enhancement Film-Matte (DBEF-M), both available from 3M Company, are examples of components that may be advantageously used in the enhancement structure 112. Prismatic structures, e.g., a layer of BEF, may be included into the first recycling enhancement structure 112 in place of or in addition to the diffuser and may optionally further include a pattern of structural variations for increased diffusion of light (see, e.g., U.S. Pat. No. 6,354,709, the disclosure of which is incorporated by reference herein to the extent it is not inconsistent with the present disclosure). Prism apexes may face toward or away from the first lightguide 130, depending on the application.

The first recycling enhancement structure 112 may be attached to a surface of the first lightguide 130, e.g., surface 130a. The first recycling enhancement structure 112 may be attached to a surface of the lightguide 130 by lamination, molding the enhancement structure 112 or any of its constituent structures onto the lightguide or by any other suitable bonding technique. If the first recycling enhancement structure 112 includes a matte surface, e.g., as in DBEF-M, the first recycling enhancement structure 112 preferably is attached to the lightguide 130, so that the diffuse surface faces the surface 130a. In exemplary embodiments of the subject disclosure, in which the first recycling enhancement structure 112 is attached to the lightguide 130, light may be extracted from the interior of the lightguide 130 through its interactions with the attached first recycling enhancement structure 112. For example, if DRPF or DBEF-M is included into the first recycling enhancement structure 112, either of these films diffuses light and either transmits it to the LCD in the proper polarization state or scatters it back into the backlighting system 100, where it can be recycled as explained above. Alternatively, DBEF may be attached to a surface of the first lightguide 130 with a layer of PSA. PSA would facilitate the extraction of light from the interior of the first lightguide 130.

In the appropriate exemplary embodiments of the present disclosure, the first recycling enhancement structure 112 may include both DBEF and DRPF, and they are preferably attached, e.g., laminated, to the surface 130a of the lightguide 130. In that case, the pass axes (polarization axes) of both reflective polarizers, i.e., DBEF and DRPF, should be aligned. As a result, DRPF will facilitate extraction of light from the lightguide 130, while DBEF will enhance the contrast. Alternatively, BEF may be used in combination with a reflective polarizer, e.g., DBEF, as a part of the first recycling enhancement structure 112. BEF would facilitate light extraction, while DBEF would ensure that light exits the backlight 100 with the appropriate polarization.

Alternatively or additionally, the backlighting system 100 illustrated in FIG. 2 may include a second recycling enhancement structure 114, which may be disposed between the lightguide 130 and the reflective cavity 140. Preferably, the second recycling enhancement structure 114 includes prismatic structures, e.g. prismatic structured film, that would aid in redirecting and recycling light to increase on-axis brightness of the backlight 100 by refracting toward the viewer light within a certain angle and reflecting back light outside that angle. One example of prismatic structured films suitable for use in the second recycling enhancement structure 114 is BEF. Alternatively, or additionally, the second recycling enhancement structure 114 may include a turning film, such as a prismatic structure with the prism apexes oriented generally away from the lightguide 130.

In the appropriate exemplary embodiments of the present disclosure, two BEFs or similar prismatic films or structures having longitudinal grooves may be used as a part of the second recycling enhancement structure 114. In such exemplary embodiments, the directions of the prismatic films' grooves preferably are crossed, and a thin layer of adhesive joins the films in such a way that only relatively small portions of the prismatic structures are immersed into the adhesive and at least some of the incident light is still appropriately redirected by the prismatic structures. The second recycling enhancement structure 114 preferably is attached, e.g., laminated, molded or bonded using any other suitable technique, to the surface 130b of the lightguide 130. This feature will provide added extraction of light from the first lightguide 130 and reduce warping of the second recycling enhancement structure 114, which may occur due to temperature variations, handling and other causes.

Referring further to FIG. 2, placing an extractor 143, preferably a diffuse extractor, at a surface of the reflective cavity 140 may facilitate light extraction from the reflective cavity 140. FIG. 2 illustrates the use of such an extractor 143, which in this exemplary embodiment includes an array of dots disposed on the reflector 147. Preferably, the pattern of dots is optimized to compensate for potential spatial non-uniformities of light extraction from the backlighting system 100. For example, the dot pattern may be adjusted so that more light is extracted toward the center of the reflective cavity 140 by gradually increasing the size of dots toward the center of the reflector 147. The backlighting system 100 may further include a diffuser sheet 116, which would serve to increase spatial uniformity of the light exiting the reflective cavity 140, as well as to aid in randomizing polarization of the light reflected back into the backlighting system 100.

Figure 4:
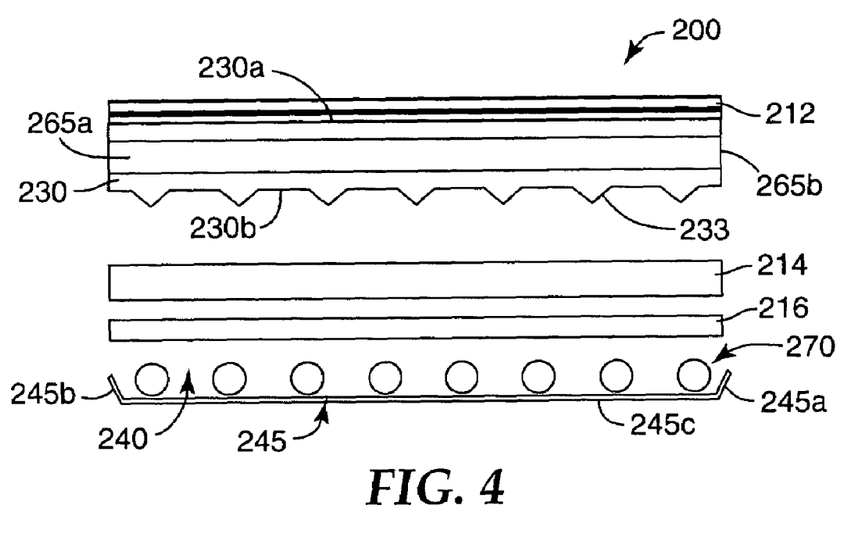
FIG. 4 is a schematic side view of another embodiment of a backlighting system according to the present disclosure.

FIG. 4 shows a schematic cross-sectional view of a backlighting system 200 constructed according to another exemplary embodiment of the present disclosure. The backlighting system 200 includes a lightguide 230 and a reflective cavity 240. The lightguide 230 may be made of acrylic or another suitable material, or it may be hollow. Light sources 265a and 265b (265b disposed opposite 265a) are placed at the edges of the lightguide 230, so that at least a portion of the light emanating from the light sources 265a and 265b is coupled into the interior of the lightguide 230 and propagates along its length by reflecting from the surfaces 230a and 230b. Reflectors may be used with the light sources 265a and 265b, such as those described in reference to the exemplary embodiment shown in FIG. 2.

Referring further to FIG. 4, the exemplary backlighting system 200 includes a reflective cavity 240 including a reflector 245, which may include side reflecting portions 245a, 245b and a back reflecting portion 245c. The side reflecting portions 245a and 245b aid in directing more light from the light sources 270 into the backlighting system 200. The reflector 245 may have a variety of suitable configurations, e.g., the configuration shown in FIG. 1 or a rectangular box-shaped configuration. The reflector 245 may be constructed from any suitable material known to those of ordinary skill in the art, including multi-layer dielectric reflectors, metal-coated reflectors and any other diffuse or specular reflector.

In the exemplary backlighting system 200, light sources 270 are placed within the interior of the reflective cavity 240, and preferably, at the back reflecting portion 245c as shown in FIG. 4. Alternatively, some or all of the light sources 270 may be disposed at the side reflecting portions 245a and 245b. Light sources suitable for use with embodiments of the present disclosure include any source that emits light, such as a fluorescent lamp (e.g., CCFL), a hot cathode fluorescent lamp (HCFL), an incandescent lamp, an electroluminescent light source, a phosphorescent light source, an external electrode fluorescent lamp, a light emitting diode (LED), including organic LEDs (OLEDs), any other suitable light source(s), or any appropriate number or combination thereof, e.g., an array of light sources. Light sources 270 may also include an extended light source such as a serpentine-shaped CCFL lamp or a fluorescent panel. If linear light sources, e.g., CCFLs or linear arrays of LEDs, arranged substantially parallel to each other are used as the light sources 270, and linear light sources are used as light sources 265a and 265b, each of the sources 265a and 265b may be arranged generally parallel, generally orthogonal or at a different angle with respect to the light sources 270. As it has been explained in reference to the exemplary embodiments illustrated in FIG. 2, the number, type, orientation and configuration of the light sources 265a, 265b and 270, the lightguide 230 and the reflective cavity 240 may vary depending on the desired performance characteristics of the backlighting system 200.

Referring further to FIG. 4, the backlighting system 200 may include a first recycling enhancement structure 212 disposed at a surface of the first lightguide 230 and preferably attached to a surface of the first lightguide 230, e.g., surface 230b. The enhancement structure 212 may be attached to a surface of the lightguide 230 by lamination, molding or any other suitable bonding technique. The first recycling enhancement structure 212 may include a reflective polarizer, such as DBEF, and a diffuser, which may be integrated within a reflective polarizer or be included as a separate component, e.g., a matte surface or a PSA structure. The PSA structure also may be used to laminate the reflective polarizer to a surface of the first lightguide 230.

Prismatic structures, e.g., BEF film, may be included into the first recycling enhancement structure 212 in place of or in addition to a diffuser and may optionally further include a pattern of structural variations for increased diffusion of light (see, e.g., U.S. Pat. No. 6,354,709, the disclosure of which is incorporated by reference herein to the extent it is not inconsistent with the present disclosure). The lightguide 230 also may include surface structures 233, e.g., prismatic surface structures disposed on the surface 230a, which would aid in splitting up images of the light sources 270 and in channeling light from the lightguide 230 in a desired direction. The surface structures 233 may include prismatic structures substantially symmetrical about a horizontal axis. Such surface structures 233 are particularly advantageous in the exemplary embodiments, where the light sources 270 are linear and are disposed substantially symmetrically about the same horizontal axis.

The backlighting system 200 also may include a second recycling enhancement structure 214 disposed between the lightguide 230 and the reflective cavity 240. Preferably, the second recycling enhancement structure 214 includes a prismatic structured film, such as BEF, which redirects and recycles light to increase on-axis output brightness of the backlighting system 200 by refracting toward the viewer light within a certain angle and reflecting back light outside that angle. Alternatively or additionally, the second recycling enhancement structure may include a turning film, such as a prismatic structure with the prism apexes oriented generally away from the lightguide 230.

In the appropriate exemplary embodiments of the present disclosure, two BEFs or similar prismatic films or structures having longitudinal grooves may be used in the second recycling enhancement structure 214. In such exemplary embodiments, the prismatic structured films are preferably joined by a thin layer of adhesive, in such a way that only small portions of the prismatic structures are immersed into the adhesive. Optionally, the second recycling enhancement structure 214 may be attached, e.g., laminated, molded or bonded using any other suitable technique, to the surface 230b of the lightguide 230. This feature would create added extraction from the lightguide 230 and prevent the second recycling enhancement structure 214 from being warped due to temperature variations or other causes. The backlighting system 200 may further include a diffuser 216, which would serve to increase spatial uniformity of the light exiting the reflective cavity 240, as well as to aid in randomizing polarization of the light reflected back into the backlighting system 200. The structure of the diffuser 216 will vary depending on the specific application, e.g., it may be a thin diffuser sheet, freestanding or attached to a rigid support such as an optically clear rigid plate.

Thus, the backlighting systems constructed according to the present disclosure allow achieving high luminance targets and address various problems encountered with the presently known backlighting systems for large high-performance LCDs. For example, the present disclosure mitigates the risks of using variable lifetime light sources, so that burnout or aging of an individual light source would not be catastrophic to the display viewing quality. Thus, if an individual light source ages or burns out in a hybrid lightguide system according to an embodiment of the present disclosure, the effect on spatial brightness and color uniformity will be relatively insignificant due to the enhanced light mixing.

The present disclosure eliminates the need for a thick diffuser traditionally used in direct-lit backlights to hide individual sources from the viewer, thus providing additional gains in brightness. In addition, light extracted directly from the top lightguide is likely to exit at a wide range of angles, which would enhance off-axis viewability of the display. Moreover, the present disclosure makes possible inclusion of additional features for preventing warp and physical damage to various recycling enhancement structures, which may be used in exemplary embodiments of the present disclosure.

Although the backlighting systems of the present disclosure have been described with reference to specific exemplary embodiments, those of ordinary skill in the art will readily appreciate that changes and modifications may be made thereto without departing from the spirit and scope of the present invention. For example, the number, type and configuration of light sources, lightguides and recycling enhancement structures used in embodiments of the present disclosure may vary. See e.g., U.S. patent application entitled "Multiple Lightguide Backlight," Attorney Case No. 58908US002, filed concurrently herewith and incorporated by reference herein to the extent it is not inconsistent with the present disclosure. In addition, it will be understood by those of ordinary skill in the art that the terms "prismatic structures," "prismatic films," "prismatic structured films" and "prisms" encompass those having structural and other variations, such as described in U.S. Pat. No. 6,354,709, as well as prismatic structures having rounded peaks. Furthermore, although the present disclosure is particularly advantageous for use in large area and high luminance applications typically associated with LCD televisions, it could also encompass LCD monitors and point of sale devices.

What is claimed is:

1. A backlighting system, comprising:
a solid lightguide having an interior;
at least one first light source optically connected to a first edge of the solid lightguide for supplying light into the interior thereof,
a reflective cavity having an interior and comprising a first reflector and a second semi-transparent reflector disposed between the lightguide and the first reflector, the first reflector and the second semi-transparent reflector defining the interior of the reflective cavity; and
at least one second light source optically connected to a first edge of the reflective cavity for supplying light into the interior thereof.

2. The backlighting system as recited in claim 1, wherein the first edge of the solid lightguide is substantially aligned with the first edge of the reflective cavity.

3. The backlighting system as recited in claim 1, wherein the first edge of the solid lightguide is not aligned with the first edge of the reflective cavity.

4. The backlighting system as recited in claim 1, further comprising a collimating structure disposed over a light source optically connected to the first edge of the reflective cavity.

5. The backtighting system as recited in claim 1, further comprising a diffuse extractor for extracting light from the reflective cavity.

6. The backlighting system as recited in claim 1, wherein the first reflector is semi-transparent.

7. The backlighting system as recited in claim 1, wherein the reflective cavity further comprises at least one light source optically connected to a second edge of the reflective cavity for supplying light into the interior thereof.

8. The backlighting system as recited in claim 7, further comprising a first collimating structure disposed over the at least one light source optically connected to the first edge of the reflective cavity and a second collimating structure over the at least one light source optically connected to the second edge of the reflective cavity.

9. The backlighting system as recited in claim 8, wherein the first and second collimating structures comprise prismatic structures having grooves generally parallel to the first and second reflectors and having prism apexes generally facing the interior of the reflective cavity.

10. The backlighting system as recited in claim 8, wherein the first and second collimating structures each comprise a two-dimensional Fresnel lens having a focal line.

11. The backlighting system as recited in claim 10, wherein the light sources are disposed near the focal lines of the two-dimensional Fresnel lenses.

12. The backlighting system as recited in claim 11, wherein the light sources include a linear array of LEDs.

13. The backlighting system as recited in claim 8, wherein the second semi-transparent reflector comprises prismatic structures having prism apexes facing generally away from the reflective cavity, and the first and second collimating structures are configured so that they transmit light substantially within a numerical aperture of the prismatic structures.

14. The backlighting system as recited in claim 8, wherein the first and second collimating structures each include a reflective polarizer having a pass axis and the second semi-transparent reflector includes a reflective polarizer having a pass axis generally orthogonal to the pass axes of the reflective polarizers included into the collimating structures.

15. The backlighting system as recited in claim 1, further comprising a first recycling enhancement structure disposed at a surface of the lightguide.

16. The backlighting system as recited in claim 1, further comprising a first recycling enhancement structure disposed at a surface of the lightguide, said first recycling enhancement structure comprising a reflective polarizer.

17. The backlighting system as recited in claim 1, further comprising a first recycling enhancement structure disposed at a surface of the lightguide, said first recycling enhancement structure comprising a reflective polarizer and a diffuser.

18. The backlighting system as recited in claim 1, further comprising a first recycling enhancement structure disposed at a surface of the lightguide, said first recycling enhancement structure comprising a reflective polarizer and a prismatic structure.

19. The backlighting system as recited in claim 1, further comprising a first recycling enhancement structure attached to a surface of the lightguide.

20. The backlighting system as recited in claim 1, further comprising a second recycling enhancement structure disposed between the lightguide and the reflective cavity.

21. The backlighting system as recited in claim 20, wherein the second recycling enhancement structure is attached to a surface of the lightguide.

22. The backlighting system as recited in claim 1, further comprising a second recycling enhancement structure disposed between the lightguide and the reflective cavity, said second recycling enhancement structure comprising a prismatic structure.

23. The backlighting system as recited in claim 1, further comprising a second recycling enhancement structure disposed between the lightguide and the reflective cavity, said second recycling enhancement structure comprising a first prismatic structure and a second prismatic structure.

* * * * *

UNITED STATES PATENT AND TRADEMARK OFFICE
CERTIFICATE OF CORRECTION

| | | |
|---|---|---|
| PATENT NO. | : 7,223,005 B2 | Page 1 of 1 |
| APPLICATION NO. | : 10/744661 | |
| DATED | : May 29, 2007 | |
| INVENTOR(S) | : David J. Lamb | |

It is certified that error appears in the above-identified patent and that said Letters Patent is hereby corrected as shown below:

On Title Page item 56
Page 2,
Column 2 under U.S. Patent Documents, Line 2, delete "2003/0063436 A1" and insert -- 2003/0067436 --, therefor.

Column 11,
Line 56, delete "thereof," and insert -- thereof; --, therefor.

Column 12,
Line 8, delete "backtighting" and insert -- backlighting --, therefor.

Signed and Sealed this

Thirty-first Day of July, 2007

JON W. DUDAS
*Director of the United States Patent and Trademark Office*

UNITED STATES PATENT AND TRADEMARK OFFICE
CERTIFICATE OF CORRECTION

PATENT NO.        : 7,223,005 B2
APPLICATION NO. : 10/744661
DATED             : May 29, 2007
INVENTOR(S)       : David J. Lamb It is certified that error appears in the above-identified patent and that said Letters Patent is hereby corrected as shown below:

On Title Page
Item 56
Page 2,
Column 2 under U.S. Patent Documents, Line 2, delete "2003/0063436 A1" and insert -- -- 2003/0067436 -- --, therefor.

Column 11,
Line 56, delete "thereof," and insert -- -- thereof; -- --, therefor.

Column 12,
Line 8, delete "backtighting" and insert -- -- backlighting -- --, therefor.

Signed and Sealed this

Twenty-first Day of August, 2007

JON W. DUDAS
*Director of the United States Patent and Trademark Office*